Jan. 13, 1953 T. CLARK 2,625,010
MEANS FOR PREVENTING INTERNAL-COMBUSTION
TURBINE UNITS FROM ICING
Filed Dec. 17, 1947
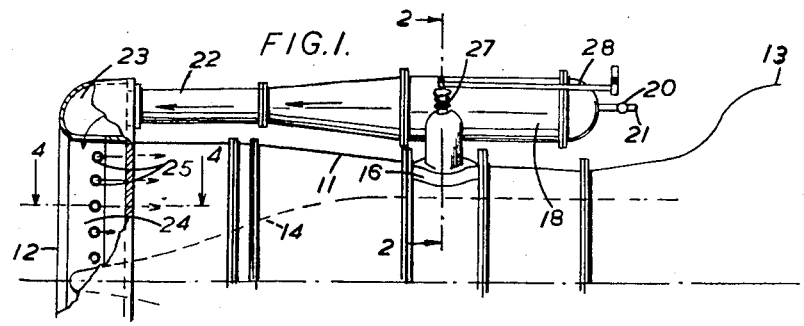
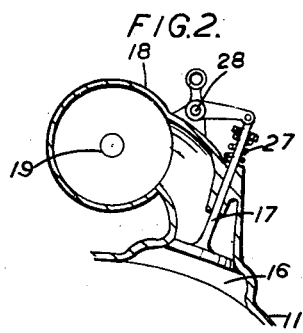
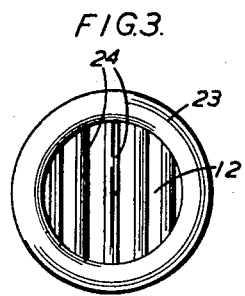
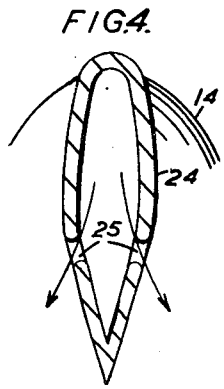
Inventor
THOMAS CLARK
By
Mawhinney & Mawhinney
Attorneys Patented Jan. 13, 1953

2,625,010

UNITED STATES PATENT OFFICE 2,625,010

MEANS FOR PREVENTING INTERNAL-COMBUSTION TURBINE UNITS FROM ICING

Thomas Clark, Coventry, England, assignor to Armstrong Siddeley Motors Limited, Coventry, England Application December 17, 1947, Serial No. 792,317
In Great Britain, April 2, 1947

4 Claims. (Cl. 60—39.09)

A known method of preventing the formation of ice in the air intake and compressor of a jet-propulsion engine for an aircraft is to raise the temperature of all the necessary stationary surfaces to such a degree that ice cannot form. This method, however, is not satisfactory in the case of an axial-flow compressor, where ice can form on the rotating blades.

An alternative method is to tap hot gases from the jet pipe and to lead them forward by suitable ducting to the air intake mouth, and by causing them to mix substantially uniformly with the incoming air a reasonably uniform temperature can be reached to prevent the formation of ice. But because the pressure in the jet is comparatively low the area of the ducting becomes relatively large and increases the frontal area of the engine, which is normally controlled by the frontal area of the main combustion chamber of the unit—usually disposed between the compressor and turbine.

The main object of the present invention is to prevent the formation of ice without the disadvantages above-mentioned.

The invention broadly consists in an internal-combustion turbine unit in which compressed air is taken from the unit to an auxiliary combustion chamber (independent of the main combustion chamber of the unit) into which fuel is injected, the burning mixture in the auxiliary combustion chamber being distributed relatively uniformly across the air intake of the unit so that icing in the compressor can be prevented.

According to a further feature of the invention, as applied to an internal-combustion turbine unit having an axial-flow compressor, an axial-flow turbine, and between the two a main combustion chamber, the auxiliary combustion chamber is disposed alongside the compressor so as not to increase the frontal area of the unit.

In the accompanying drawing:

Figure 1 is a fragmentary part-sectional view of the compressor end of an internal-combustion turbine unit adapted according to the invention;

Figure 2 is a section on the line 2—2 of Figure 1 to a larger scale;

Figure 3 is an end elevation of the unit taken from the left of Figure 1, and to a smaller scale; and Figure 4 is a section on the line 4—4 of Figure 1 to a much larger scale.

The drawing shows part of the outline 11 of an axial-flow compressor, 12 being the inlet end thereof, and joined to the outlet end is the annular casing 13 the main combustion chamber of the unit the outlet of which is connected to an axial-flow turbine (not shown). The outline of the compressor rotor is indicated by the line 14.

In the construction shown compressed air is abstracted from the compressor at a relatively-low pressure point 16 past a valve 17, which can be operated to cut off the supply when icing conditions are not prevalent, and delivered to the auxiliary combustion chamber 18, in the form of an elongated one arranged alongside the compressor so as not to increase the frontal area of the unit. The chamber 18 has a nozzle 19 through which fuel, controlled by a valve shown diagrammatically at 20, can be supplied by a pipe line 21. A relatively-short duct 22 is taken forwardly from the auxiliary combustion chamber to an annular chamber 23 round the air intake 12, and thence the combustion products are distributed relatively-uniformly across the air intake. The distribution may be effected by means of a plurality of pipes 24 extending across the intake opening, the pipes being of stream-lined section and having a plurality of outlets 25, 25 on opposite sides.

In ordinary conditions it is not proposed to vary the quantity of air to be delivered to the auxiliary combustion chamber in this way (except to cut off the supply completely when icing is unlikely to occur), but instead to control the temperature of the combustion products by regulating the supply of fuel to the auxiliary combustion chamber. It may be that, in the worst conditions, a temperature of, say, 700° C. will be required, in the case of an aircraft propelled by such a turbine unit. On that assumption the air to be passed by the valve 17 should be sufficient for complete combustion to be effected when the maximum amount of fuel (to give the assumed temperature of 700° C.) is being injected. The drawings show a spring 27 for closing the valve, and a rockable shaft 28 by which it can be opened to a desired extent and held open.

On the other hand it may be necessary to protect the engine from ice while idling. For example, when coming in to land from a high altitude, the aircraft may glide for some distance with the units idling, in which case the pressure available at the compressor will be very much reduced. It may therefore be necessary to increase the opening past the air valve 17 in order to allow sufficient air to pass. This will be more important on a compound turbine unit where the proportion of work done by the low pressure compressor is reduced considerably at part-throttle conditions. The valve 17 may therefore be one having a medium open position, for normal running, and a maximum-open position for such idling conditions.

What I claim as my invention and desire to secure by Letters Patent of the United States is:

1. In combination with an internal-combustion turbine unit including a compressor and a main combustion chamber in which air from said compressor is heated for driving the unit, ice preventing equipment for the unit comprising an auxiliary combustion chamber which is independent of said main combustion chamber and positioned alongside the compressor so as not to increase the area of the unit in end elevation, controllable means for supplying air from said compressor to said auxiliary combustion chamber, controllable means for supplying fuel to said auxiliary combustion chamber to be burnt therein, and means for delivering the products of combustion in said auxiliary combustion chamber throughout the intake end of said compressor.

2. The combination with an internal-combustion turbine unit including an axial-flow compressor and a main combustion equipment in which air from said compressor is heated for driving the unit, of ice preventing equipment for the unit comprising an elongated combustion chamber which is independent of said main combustion equipment and is disposed alongside said compressor, means for supplying air from a low pressure point of said compressor to said combustion chamber, means for supplying fuel to said combustion chamber to be burnt therein, and means for delivering the heated mixture in said combustion chamber throughout the intake end of said compressor.

3. In combination with an internal-combustion turbine unit including an axial-flow compressor and a main combustion equipment in which air from said compressor is heated to drive the unit, said main combustion equipment being generally coaxial with said compressor and of greater area than said compressor in end elevation, ice preventing equipment for the unit comprising an elongated combustion chamber in which air from a low pressure point of said compressor is heated by the burning of fuel therein, said elongated combustion chamber being independent of said main combustion equipment and disposed alongside said compressor so as not to increase the area of the unit in end elevation, a casing providing an annular chamber around the intake end of said compressor, and a short duct connecting the outlet end of said auxiliary combustion chamber to said casing, said casing adapted to deliver the heated mixture in said auxiliary combustion chamber throughout the intake end of said compressor.

4. For use with an internal-combustion turbine unit having coaxially arranged main combustion equipment and an axial-flow compressor the outer surface of the compressor being at a less distance from the axis of the equipment and the compressor than is the outer surface of the main combustion equipment to provide a space alongside of the compressor which lies substantially within the plane containing the outer surface of the main combustion equipment, an improved ice preventing equipment for the unit comprising an auxiliary combustion chamber adapted to be substantially entirely disposed within said space, means adapted to communicate with the compressor for supplying air from a low pressure point of the compressor to said auxiliary combustion chamber, means for supplying fuel to said auxiliary combustion chamber to be burnt therein, and means adapted to deliver the heated mixture from said auxiliary combustion chamber throughout the intake end of the compressor.

THOMAS CLARK.

REFERENCES CITED

The following references are of record in the file of this patent:

UNITED STATES PATENTS

| Number | Name | Date |
| --- | --- | --- |
| 1,924,122 | Jones | Aug. 29, 1933 |
| 2,379,455 | Prince | July 3, 1945 |
| 2,393,792 | McCollum | Jan. 29, 1946 |
| 2,404,275 | Clark et al. | July 16, 1946 |
| 2,409,177 | Allen et al. | Oct. 15, 1946 |
| 2,425,630 | McCollum | Aug. 12, 1947 |
| 2,435,990 | Weiler | Feb. 17, 1948 |

FOREIGN PATENTS

| Number | Country | Date |
| --- | --- | --- |
| 586,572 | Great Britain | Mar. 24, 1947 |